United States Patent
Aoki

(10) Patent No.: US 10,166,500 B2
(45) Date of Patent: Jan. 1, 2019

(54) EXHAUST GAS TREATING DEVICE, TEMPERATURE RAISING METHOD OF CATALYST, REGENERATION METHOD OF HONEYCOMB STRUCTURE, AND ASH REMOVING METHOD

(71) Applicant: NGK INSULATORS, LTD., Nagoya (JP)

(72) Inventor: Takashi Aoki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 151 days.

(21) Appl. No.: 15/248,125

(22) Filed: Aug. 26, 2016

(65) Prior Publication Data

US 2017/0065918 A1    Mar. 9, 2017

(30) Foreign Application Priority Data

Sep. 4, 2015   (JP) .................. 2015-175150

(51) Int. Cl.
*B01D 46/00*    (2006.01)
*B01D 46/24*    (2006.01)
(Continued)

(52) U.S. Cl.
CPC ..... *B01D 46/0061* (2013.01); *B01D 46/0087* (2013.01); *B01D 46/247* (2013.01); *B01D 46/2422* (2013.01); *B01D 46/2459* (2013.01); *B01D 46/2462* (2013.01); *B01D 46/2474* (2013.01); *B01D 46/4236* (2013.01); *F01N 3/0222* (2013.01); *F01N 3/0232* (2013.01); *F01N 3/031* (2013.01); *F01N 9/002* (2013.01); *F01N 13/0093* (2014.06); *F01N 13/0097* (2014.06); *B01D 2279/30* (2013.01); *F01N 3/035* (2013.01); *F01N 2240/36* (2013.01); *F01N 2250/02* (2013.01); *F01N 2330/06* (2013.01); *Y02T 10/47* (2013.01)

(58) Field of Classification Search
None
See application file for complete search history.

(56) References Cited

U.S. PATENT DOCUMENTS 7,510,588 B2 *   3/2009   Kudo ................. B01D 39/2068
                                                                55/523
8,940,242 B2 *   1/2015   Chen .................... F01N 3/2828
                                                                422/177

(Continued)

FOREIGN PATENT DOCUMENTS

EP    2 380 649 A1    10/2011
EP    2 380 649 B1     4/2015
(Continued)

*Primary Examiner* — Amber R Orlando
(74) *Attorney, Agent, or Firm* — Burr & Brown, PLLC

(57) ABSTRACT

An exhaust gas treating device includes a honeycomb structure including an inner honeycomb structure body, an outer honeycomb structure body disposed at a position which surrounds a part of a circumference of the inner honeycomb structure body and is away from the inner inflow end face of the inner honeycomb structure body, and plugging portions arranged in parts of cells; a can member which stores the honeycomb structure and has an inlet and a second outlet for an exhaust gas; and an opening/closing valve to open and close the second outlet of the can member.

16 Claims, 7 Drawing Sheets

(51) Int. Cl.
   *B01D 46/42*   (2006.01)
   *F01N 3/022*   (2006.01)
   *F01N 3/023*   (2006.01)
   *F01N 9/00*    (2006.01)
   *F01N 3/031*   (2006.01)
   *F01N 13/00*   (2010.01)
   *F01N 3/035*   (2006.01)

(56) References Cited

U.S. PATENT DOCUMENTS

| | | | |
|---|---|---|---|
| 8,978,366 B2 * | 3/2015 | Brugger | F01N 3/035 |
| | | | 60/295 |
| 9,080,484 B2 | 7/2015 | Miyairi | |
| 9,322,309 B2 * | 4/2016 | Beyer | F01N 3/20 |
| D763,427 S | 8/2016 | Miyairi | |
| 2006/0107656 A1 * | 5/2006 | Bruck | F01N 3/281 |
| | | | 60/288 |
| 2008/0110341 A1 * | 5/2008 | Ketcham | F01N 3/0222 |
| | | | 95/274 |
| 2008/0264048 A1 * | 10/2008 | Nishiyama | B01D 53/9431 |
| | | | 60/299 |
| 2009/0241780 A1 * | 10/2009 | Ohya | F01N 3/023 |
| | | | 95/279 |
| 2012/0260639 A1 * | 10/2012 | Bruck | F01N 3/28 |
| | | | 60/311 |
| 2014/0298779 A1 | 10/2014 | Miyairi | |

FOREIGN PATENT DOCUMENTS

| | | |
|---|---|---|
| JP | 5584487 B2 | 9/2014 |
| JP | 2014-200741 A1 | 10/2014 |

* cited by examiner

EXHAUST GAS TREATING DEVICE, TEMPERATURE RAISING METHOD OF CATALYST, REGENERATION METHOD OF HONEYCOMB STRUCTURE, AND ASH REMOVING METHOD

The present application is an application based on JP-2015-175150 filed on Sep. 4, 2015 with Japan Patent Office, the entire contents of which are incorporated herein by reference.

BACKGROUND OF THE INVENTION

Field of the Invention

The present invention relates to an exhaust gas treating device, a temperature raising method of a catalyst in which this exhaust gas treating device is used, a regeneration method of a honeycomb structure, and an ash removing method. More particularly, it relates to an exhaust gas treating device which can be downsized as a whole and which is easily heated and hard to be rapidly cooled and in which an increase of pressure loss is suppressed, a temperature raising method of a catalyst in which this exhaust gas treating device is used, a regeneration method of a honeycomb structure, and an ash removing method.

Description of the Related Art

Heretofore, internal combustion engines such as a gasoline engine and a diesel engine have a problem that cinders are generated during combustion of fuel. To eliminate the problem, from the viewpoint of atmospheric environment, A removal of harmful components included in an exhaust gas and countermeasures to prevent a particulate matter (hereinafter also referred to as "the PM" sometimes) such as soot or ash from being discharged to the atmosphere are required.

Further, as a filter which removes the PM or the like emitted from the diesel engine or the like to purify the exhaust gas, a diesel particulate filter is known (see Patent Documents 1 and 2).

Furthermore, for example, as characteristics of a direct injection type gasoline engine, it is known that a fuel efficiency improves as compared with a port injection type engine. However, the direct injection type gasoline engine has the problem that a larger amount of soot is generated at a start of the engine or during acceleration, though the fuel efficiency improves. To eliminate the problem, at present, a filter (GPF) similar to a filter (DPF) broadly used in the diesel engine is used in the direct injection type gasoline engine.

[Patent Document 1] JP-A-2014-200741
[Patent Document 2] JP 5584487

SUMMARY OF THE INVENTION

Here, examples of a method of mounting a GPF in a car or the like include a method of adding the GPF to existing TWC and a method of replacing the existing TWC with the GPF coated with a catalyst. However, in any of the methods, a volume of the GPF is required to be increased to suppress an increase of pressure loss. On the other hand, in an exhaust tube of the car or the like, enlarging an engine or an indoor space is given priority, and then this limits a mounting space for the filter or the like, and this limitation of the mounting space has the problem that a larger volume of the GPF cannot be acquired.

Furthermore, it has heretofore been known that an amount of ash (i.e., the ash (oil ash) derived from an additive component of oil) which is proportional to a running distance is deposited in a DPF. Therefore, when the GPF is mounted in the car or the like, the ash derived from the additive component of the oil is also deposited in the GPF. However, in the GPF, a capacity to deposit this oil ash is small, and hence depositing of the oil ash causes raising the pressure loss. This raising the pressure loss has problems that a fuel efficiency deteriorates and that an engine output cannot sufficiently be obtained.

Furthermore, in a direct injection type gasoline engine, a soot is generated in a specific operation region (an initial operation region) such as a start of the engine and a high load region (a region where a high load is applied as in rapid acceleration, climbing travel or the like), and the soot is hardly generated in another operating state. Therefore, in the mounted GPF, a way to reduce the pressure loss becomes an issue more than an effect of trapping the soot, in the operating state other than the operating states of the initial operation region and high load region.

Thus, to suitably mount an exhaust gas treating device in the car or the like where the mounting space is small, there has been earnestly desired development of the exhaust gas treating device which can be downsized as a whole and in which an increase of pressure loss is suppressed. Furthermore, there has been earnestly desired the development of the exhaust gas treating device which is easily heated and hard to be rapidly cooled, and is therefore excellent in purifying performance.

The present invention has been developed in view of such problems of the conventional technologies, and an object thereof is to provide an exhaust gas treating device which can be downsized as a whole and which is easily heated and hard to be rapidly cooled and in which an increase of pressure loss is suppressed, a temperature raising method of a catalyst in which this exhaust gas treating device is used, a regeneration method of a honeycomb structure, and an ash removing method.

The present invention provides an exhaust gas treating device, a temperature raising method of a catalyst in which this exhaust gas treating device is used, a regeneration method of a honeycomb structure, and an ash removing method as mentioned below.

[1] An exhaust gas treating device including a honeycomb structure having porous partition walls defining a plurality of cells extending from a first end face which is one end face to a second end face which is the other end face; a can member which stores the honeycomb structure and has an inlet and an outlet for an exhaust gas; and an opening/closing valve disposed in the outlet of the can member to open and close the outlet, wherein the honeycomb structure includes an inner honeycomb structure body including a honeycomb substrate having porous inner partition walls defining the plurality of cells extending from an inner inflow end face which is the end face on the side of the first end face to an inner outflow end face which is the end face on the side of the second end face and a circumferential wall disposed at a circumference of the honeycomb substrate, an outer honeycomb structure body disposed at a position which surrounds a part of a circumference of the inner honeycomb structure body and is away from the inner inflow end face of the inner honeycomb structure body, the outer honeycomb structure body has porous outer partition walls defining the plurality of cells extending from an outer inflow end face which is the end face on the side of the second end face to an outer outflow end face which is the end face on the side of the first end face, and plugging portions arranged in parts of the cells, the can member includes an inflow tube which fits with an end portion of the inner honeycomb structure body on the side of the inner inflow end face and in which the inlet is formed, and a barrel portion which is continuous with the inflow tube, and in the barrel portion, a first outlet of the exhaust gas is formed at a position between the inner inflow end face of the inner honeycomb structure body and the outer outflow end face of the outer honeycomb structure body, and a second outlet of the exhaust gas is formed at a position which faces the second end face of the honeycomb structure, and the honeycomb structure is stored in the can member in a state of having a clearance which serves as a through channel for the exhaust gas between the second end face and the can member and having a clearance which serves as a through channel for the exhaust gas between the outer outflow end face of the outer honeycomb structure body and the can member.

[2] The exhaust gas treating device according to the above [1], which includes a bypass pipe in which one end portion is coupled with the first outlet of the barrel portion and the other end portion is coupled with a position behind the opening/closing valve in an exhaust pipe coupled with the second outlet of the barrel portion; and a second valve disposed in the bypass pipe.

[3] The exhaust gas treating device according to the above [1] or [2], wherein the honeycomb structure is disposed so that the outer outflow end face of the outer honeycomb structure body faces downward and so that an extending direction of the cells is parallel to a vertical direction.

[4] The exhaust gas treating device according to any one of the above [1] to [3], wherein the plugging portions are not arranged in the inner honeycomb structure body or are arranged only in one end portion of the inner honeycomb structure body, and the plugging portions are arranged only in one of end portions of the outer honeycomb structure body or are arranged in both of the end portions.

[5] The exhaust gas treating device according to the above [4], wherein the plugging portions are arranged in end portions of the predetermined cells of the cells of the outer honeycomb structure body on the side of the outer inflow end face and end portions of the residual cells of the cells on the side of the outer outflow end face, and the plugging portions are not arranged in the inner honeycomb structure body.

[6] The exhaust gas treating device according to the above [4], wherein the plugging portions are arranged in parts of end portions of the inner honeycomb structure body on the side of any one of the inner inflow end face and the inner outflow end face.

[7] The exhaust gas treating device according to any one of the above [1] to [6], wherein a thickness of the outer partition walls of the outer honeycomb structure body is larger than a thickness of the inner partition walls of the inner honeycomb structure body.

[8] The exhaust gas treating device according to any one of the above [1] to [7], wherein a cell density of the outer honeycomb structure body is smaller than a cell density of the inner honeycomb structure body.

[9] The exhaust gas treating device according to any one of the above [1] to [8], wherein the circumferential wall of the inner honeycomb structure body is formed integrally with the inner partition walls of the inner honeycomb structure body.

[10] The exhaust gas treating device according to any one of the above [1] to [9], wherein in the can member, an outlet for EGR which connects with a route to recirculate the exhaust gas is formed at a position between the inner inflow end face of the inner honeycomb structure body and the outer outflow end face of the outer honeycomb structure body.

[11] The exhaust gas treating device according to any one of the above [1] to [10], wherein a sound absorbing material is disposed in a clearance between the second end face and the can member.

[12] A temperature raising method of a catalyst loaded onto the honeycomb structure of the exhaust gas treating device according to any one of the above [1] to [11], which includes closing the opening/closing valve of the exhaust gas treating device; and raising a pressure of an exhaust gas in the can member of the exhaust gas treating device to raise a temperature of the exhaust gas, thereby raising a temperature of the catalyst loaded onto the honeycomb structure.

[13] A temperature raising method of a catalyst loaded onto the honeycomb structure of the exhaust gas treating device according to any one of the above [1] to [11], which includes raising, by a supercharger, a pressure of an exhaust gas in the can member of the exhaust gas treating device to raise a temperature of the exhaust gas, thereby raising a temperature of the catalyst loaded onto the honeycomb structure.

[14] A regeneration method of a honeycomb structure in a state where soot is deposited in the honeycomb structure of the exhaust gas treating device according to any one of the above [1] to [11], which includes closing the opening/closing valve of the exhaust gas treating device including the honeycomb structure in which the soot is deposited; raising a pressure of an exhaust gas in the can member of the exhaust gas treating device to raise a temperature of the exhaust gas; and burning the soot, thereby regenerating the honeycomb structure.

[15] A regeneration method of a honeycomb structure in a state where soot is deposited in the honeycomb structure of the exhaust gas treating device according to any one of the above [1] to [11], which includes raising, by a supercharger, a pressure of an exhaust gas in the can member of the exhaust gas treating device to raise a temperature of the exhaust gas; and burning the soot, thereby regenerating the honeycomb structure.

[16] An ash removing method of removing ash of a honeycomb structure in a state where the ash is deposited in the honeycomb structure of the exhaust gas treating device according to any one of the above [2] to [11], which includes opening the opening/closing valve while closing the second valve in the exhaust gas treating device, to generate a flow of a fluid from the outer outflow end face of the outer honeycomb structure body of the honeycomb structure toward the outer inflow end face, thereby removing the ash deposited in the outer honeycomb structure body of the honeycomb structure.

An exhaust gas treating device of the present invention includes a predetermined honeycomb structure and a predetermined can member which stores this honeycomb structure, so that the device can be downsized as a whole and is easily heated and hard to be rapidly cooled, and an increase of pressure loss is suppressed.

In a temperature raising method of a catalyst of the present invention, the exhaust gas treating device of the present invention is used, and a temperature of a catalyst loaded onto the honeycomb structure can be suitably raised.

In a regeneration method of the honeycomb structure of the present invention, the exhaust gas treating device of the present invention is used, and the honeycomb structure in which a soot is deposited can be suitably regenerated.

In an ash removing method of the present invention, the exhaust gas treating device of the present invention is used, and ash can be suitably removed from the honeycomb structure in which the ash is deposited.

DESCRIPTION OF THE PREFERRED EMBODIMENTS

Hereinafter, embodiments of the present invention will be described. It is to be understood that the present invention is not limited to the following embodiments, and changes, improvements and the like suitably added to the following embodiments on the basis of ordinary knowledge of a person skilled in the art without departing from the gist of the present invention also fall in the scope of the present invention.

Figure 1:
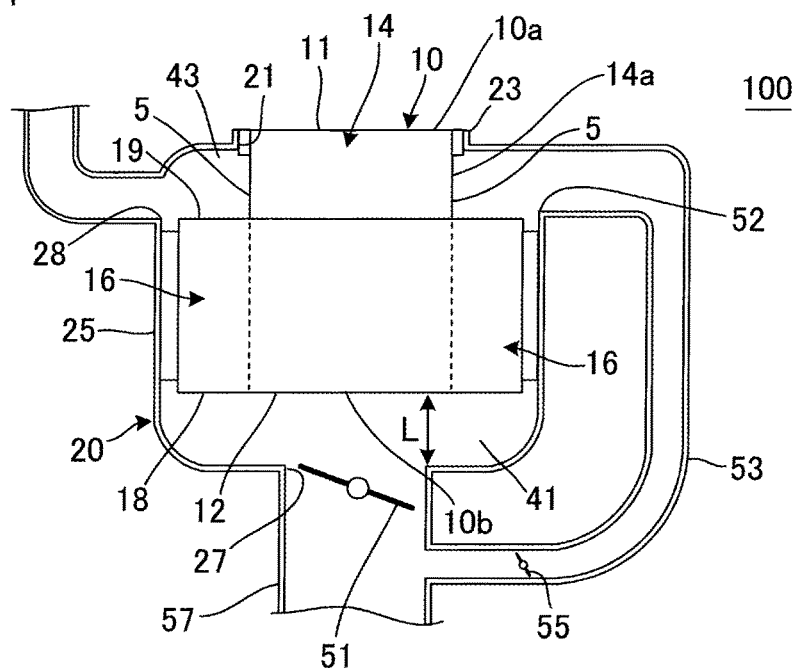
FIG. 1 is a cross-sectional view schematically showing a cross section of one embodiment of an exhaust gas treating device of the present invention.

[1] Exhaust Gas Treating Device:

One embodiment of an exhaust gas treating device of the present invention is an exhaust gas treating device 100 shown in FIG. 1. The exhaust gas treating device 100 includes a honeycomb structure 10, a can member 20 which stores the honeycomb structure 10 and serves as a passage of an exhaust gas, and an opening/closing valve 51 disposed in a second outlet 27 of the can member 20 to open and close the second outlet 27.

Figure 3:
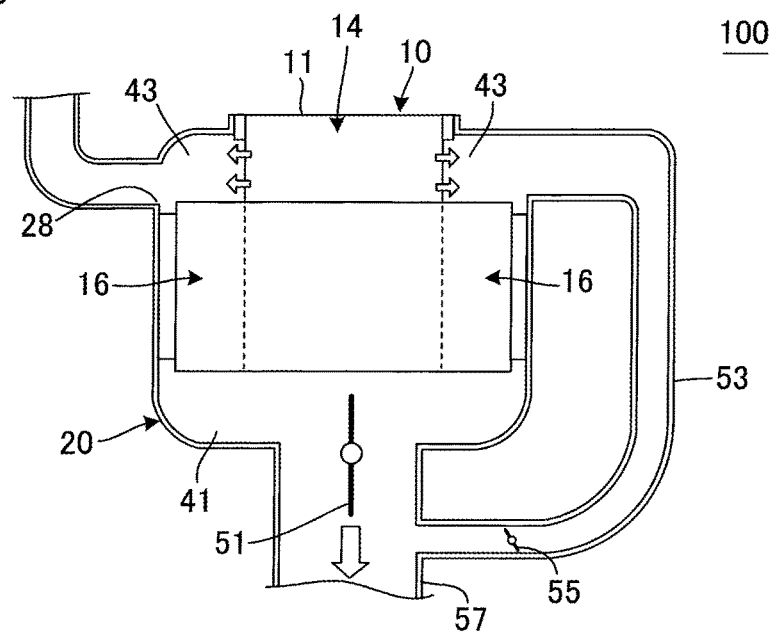
FIG. 3 is an explanatory view schematically showing the flow of the exhaust gas in one embodiment of the exhaust gas treating device of the present invention.

Further, as shown in FIG. 3, the honeycomb structure 10 includes an inner honeycomb structure body 14, an outer honeycomb structure body 16 positioned on an outer side of this inner honeycomb structure body 14, and plugging portions 8. The inner honeycomb structure body 14 includes a honeycomb substrate 30 having porous inner partition walls 1, and a circumferential wall 5 disposed at a circumference of the honeycomb substrate 30. The honeycomb substrate 30 has the inner partition walls 1 defining a plurality of cells 2 extending from an inner inflow end face 11 as one end face which serves as a through channel for the exhaust gas and into which the exhaust gas flows to an inner outflow end face 12 (see FIG. 4) as the other end face from which the exhaust gas flows outside. The outer honeycomb structure body 16 is disposed at a position which surrounds a part of a circumference of the inner honeycomb structure body 14 and is away from the inner inflow end face 11 of the inner honeycomb structure body 14. Further, the outer honeycomb structure body 16 has porous outer partition walls 3 defining the plurality of cells 2 extending from an outer inflow end face 18 which is the end face on the side of a second end face 10b to an outer outflow end face 19 which is the end face on the side of a first end face 10a. The plugging portions 8 are arranged in parts of the cells 2.

The can member 20 includes an inflow tube 23 which fits with an end portion of the inner honeycomb structure body 14 on the side of the inner inflow end face 11 and in which an inlet 21 is formed, and a barrel portion 25 which is continuous with the inflow tube 23. In the barrel portion 25, a first outlet 52 of the exhaust gas is formed at a position between the inner inflow end face 11 of the inner honeycomb structure body 14 and the outer outflow end face 19 of the outer honeycomb structure body 16. Furthermore, the second outlet 27 of the exhaust gas is formed at a position which faces the second end face 10b of the honeycomb structure 10.

The honeycomb structure 10 is stored in the can member 20 in a state of having a clearance (a space which will hereinafter also be referred to as "a return space" sometimes) 41 which serves as a through channel for the exhaust gas between the second end face 10b and the can member 20. Furthermore, the honeycomb structure 10 is stored in the can member 20 in a state of having a clearance (a space which will hereinafter be referred to also as "a temperature raising assistance space" sometimes) 43 which serves as a through channel for the exhaust gas between the outer outflow end face 19 of the outer honeycomb structure body 16 and the can member 20.

In this way, the exhaust gas treating device 100 includes the honeycomb structure 10, the can member 20 which stores the honeycomb structure 10, and the opening/closing valve 51. This allows the exhaust gas treating device 100 to be downsized as a whole, to be easily heated, and hard to be rapidly cooled, and furthermore, allows an increase of pressure loss to be suppressed.

Figure 2:
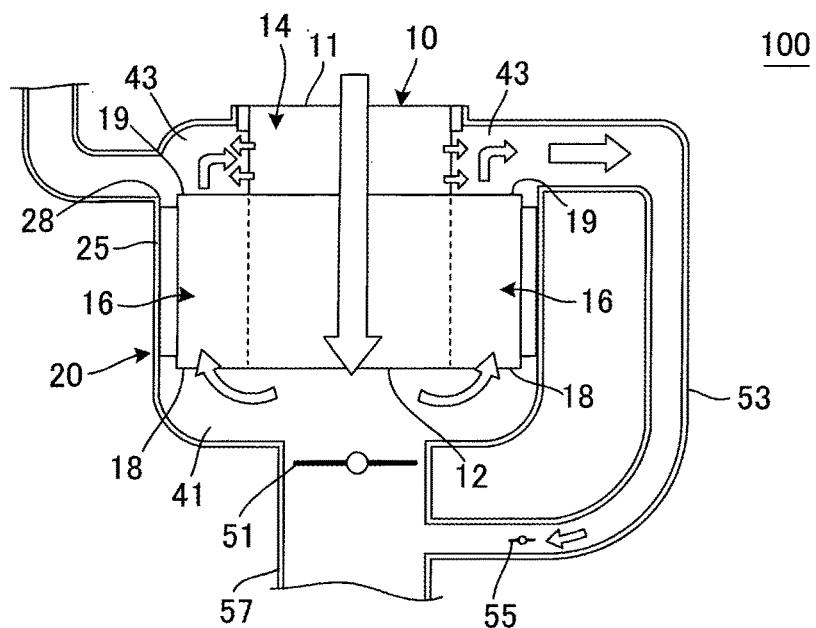
FIG. 2 is an explanatory view schematically showing a flow of an exhaust gas in one embodiment of the exhaust gas treating device of the present invention.

In the exhaust gas treating device 100, as shown in FIG. 2, at a start of an engine, the opening/closing valve 51 is closed, and further, a second valve 55 disposed in a bypass pipe 53 is opened.

In the exhaust gas treating device 100 of such a state, the exhaust gas flows into the honeycomb structure 10 from the side of the inner inflow end face 11 of the inner honeycomb structure body 14 of the honeycomb structure 10, and flows out from the inner outflow end face 12 of the inner honeycomb structure body 14. Afterward, the exhaust gas flows into the clearance (the return space) 41 formed between the barrel portion 25 and the inner outflow end face 12 and the outer inflow end face 18. Further, the exhaust gas flows into the outer honeycomb structure body 16 from the side of the outer inflow end face 18 of the outer honeycomb structure body 16, and flows out from the outer outflow end face 19. At this time, the exhaust gas flowing out from the outer outflow end face 19 of the outer honeycomb structure body 16 is introduced into the space (the temperature raising assistance space) 43 between the circumferential wall 5 of the inner honeycomb structure body 14 and the barrel portion 25 of the can member 20, and the exhaust gas is emitted from the second outlet 27 of the can member 20 while coming into contact with the circumferential wall 5. It is to be noted that, in a certain case, the exhaust gas flowing into the inner honeycomb structure body 14 flows out to the temperature raising assistance space 43 as it is without flowing out from the inner outflow end face 12. Further, the exhaust gas flowing out to the temperature raising assistance space 43 flows through the bypass pipe 53 and is emitted from an exhaust pipe 57 coupled with the second outlet 27 of the can member 20. Note that the arrow in FIG. 2 illustrates the flow of the exhaust gas.

That is, at the start of the engine, the exhaust gas emitted from the outer honeycomb structure body 16 directly hits on the circumferential wall 5 of the inner honeycomb structure body 14. Therefore, a portion on which the exhaust gas directly hits (an after-mentioned convex portion 14a) is heated from its outside by the above exhaust gas. Therefore, the exhaust gas treating device 100 is easily heated and hard to be rapidly cooled. Further, the exhaust gas flows along such a route as described above in the can member 20, and hence the exhaust gas treating device 100 can be downsized as a whole. It is to be noted that in a state where a catalyst is not applied, the exhaust gas directly hitting on the circumferential wall 5 passes through the honeycomb structure 10, and hence a temperature of the exhaust gas becomes lower than that of the exhaust gas first flowing into the honeycomb structure 10. However, in a state where the catalyst is applied, the temperature of the exhaust gas can be raised to be higher than the temperature of the exhaust gas flowing inside by heat generated in a catalytic reaction. Therefore, it is possible to promote the temperature raising of the honeycomb structure 10 as described above. Furthermore, when a cooled gas (the exhaust gas having its temperature lowered in an idling state or a situation where a car descends along a slope) flows into the honeycomb structure 10, this exhaust gas (the cooled gas) is warmed while passing through the honeycomb structure 10, and the warmed exhaust gas has a temperature to such an extent that the warmed exhaust gas hits on the circumferential wall 5 to prevent temperature drop of the honeycomb structure.

Furthermore, in the exhaust gas treating device 100, as shown in FIG. 3, after the elapse of an initial stage of the start of the engine (approximately one minute later), the opening/closing valve 51 is opened and furthermore, the second valve 55 disposed in the bypass pipe 53 is closed.

In the exhaust gas treating device 100 of such a state, the exhaust gas flows into the honeycomb structure 10 from the side of the inner inflow end face 11 of the inner honeycomb structure body 14 of the honeycomb structure 10, and flows out from the inner outflow end face 12 of the inner honeycomb structure body 14. Afterward, in the exhaust gas treating device 100, the opening/closing valve 51 is opened, and hence the above exhaust gas is emitted as it is from the exhaust pipe 57 (without permeating the outer honeycomb structure body 16 of the honeycomb structure 10). Especially in a direct injection type gasoline engine, a soot is hardly emitted from the above engine after the elapse of the initial stage of the start of the engine. This allows the exhaust gas treating device 100 to emit the exhaust gas emitted from the engine to the outside only through the inner honeycomb structure body 14. Note that the arrow in FIG. 3 illustrates the flow of the exhaust gas.

Furthermore, in the exhaust gas treating device 100, the exhaust gas flows through a filter only in a limited operating state, and hence an amount of ash to be deposited in the filter can be decreased. That is, an amount of the ash deposited in the filter is increased as a running distance increases. However, the exhaust gas flows through the filter in a limited manner as described above, and hence the amount of the ash deposited can be decreased as compared with a case where the exhaust gas always flows through the filter. This allows the exhaust gas treating device 100 to suppress the increase of the pressure loss. Specifically, in the exhaust gas treating device 100, the increase of the pressure loss during the deposition of the ash is suppressed. Furthermore, in the exhaust gas treating device 100, the increase of the pressure loss is suppressed also during a usual operation (a steady operation).

That is, at the start of the engine, the opening/closing valve 51 is closed to obtain a route along which the exhaust gas flows through a GPF as described above. Further, during the usual operation (the steady operation), an amount of the exhaust gas flowing through the GPF is decreased (or adjusted into zero), so that the ash can be suppressed from being deposited more than necessary in the honeycomb structure 10, and the increase of the pressure loss due to permeation of the exhaust gas through the GPF can be suppressed as much as possible. On the other hand, when the second valve 55 is completely closed, a negative pressure is generated in the honeycomb structure 10, and hence in the honeycomb structure 10, a flow (reverse flow) of the exhaust gas toward the side of the outer inflow end face 18 from the side of the outer outflow end face 19 is generated in the outer honeycomb structure body 16. In this way, the reverse flow which is generated in the honeycomb structure 10 allows the ash accumulated in the honeycomb structure 10 to be emitted from the exhaust gas treating device 100. That is, in the exhaust gas treating device 100, backwashing of the honeycomb structure 10 can be carried out by the above reverse flow.

Figure 4:
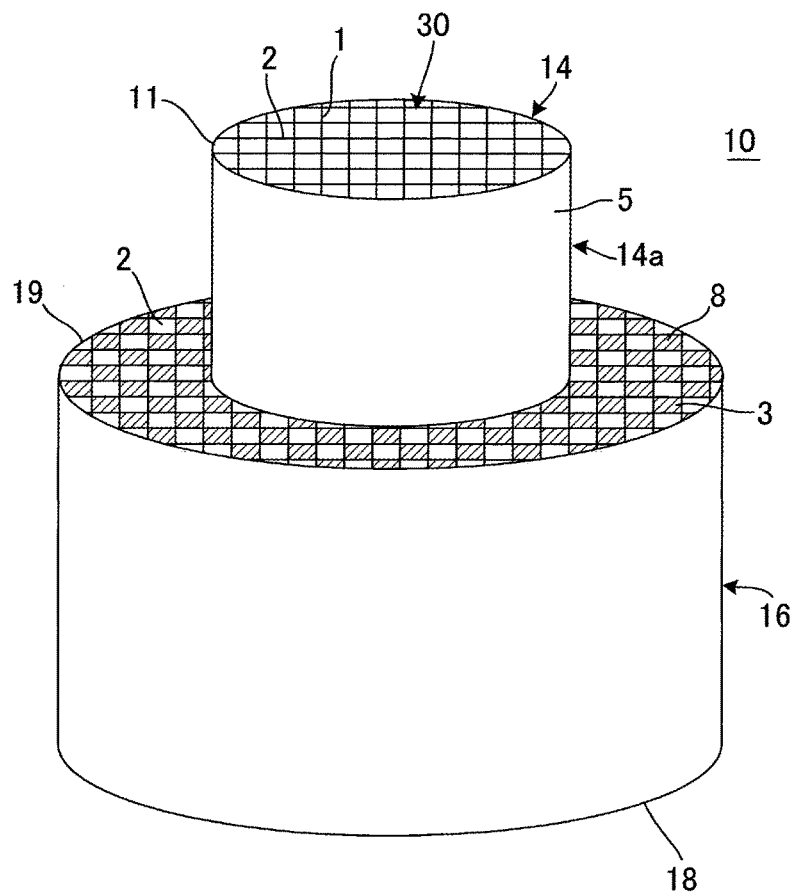
FIG. 4 is a perspective view schematically showing a honeycomb structure included in one embodiment of the exhaust gas treating device of the present invention.

FIG. 1 is a cross-sectional view schematically showing a cross section of one embodiment of the exhaust gas treating device of the present invention. FIG. 2 is an explanatory view schematically showing the flow of the exhaust gas in one embodiment of the exhaust gas treating device of the present invention. FIG. 3 is an explanatory view schematically showing the flow of the exhaust gas in one embodiment of the exhaust gas treating device of the present invention. FIG. 4 is a perspective view schematically showing the honeycomb structure included in one embodiment of the exhaust gas treating device of the present invention.

[1-1] Honeycomb Structure:

An example of the honeycomb structure of the exhaust gas treating device of the present invention is the honeycomb structure 10 shown in FIG. 4. As shown in FIG. 4, it can be considered that the honeycomb structure 10 has a pillar shape having the portion convexly projecting from a center of one end face (the convex portion 14a).

The outer honeycomb structure body 16 is disposed at a position away from the inner inflow end face 11 of the inner honeycomb structure body 14. Specifically, the position of the outer honeycomb structure body 16 from the inner inflow end face 11 is preferably from 10 to 60% and further preferably from 20 to 50% of a total length of the honeycomb structure in a cell extending direction. When the length ratio is in such a range, the honeycomb structure can be held in the can member while improving a temperature raising performance. In other words, the length ratio of the above convex portion of the honeycomb structure in the cell extending direction is preferably in the above range.

An area of the inner inflow end face 11 is preferably from 5 to 50% and further preferably from 10 to 40% of a total area of the inner inflow end face 11 and the outer outflow end face 19. When the area ratio is in such a range, an area of a portion which functions as the filter can be acquired. Furthermore, the pressure loss of the exhaust gas treating device can be decreased.

An average pore diameter of each of the partition walls (the inner partition walls and outer partition walls) and the circumferential wall is preferably from 5 to 30 μm and further preferably from 9 to 25 μm. When the average pore diameter is in such a range, closing of pores by the catalyst or PM can be suppressed. Furthermore, the pressure loss can be reduced. This average pore diameter is a value measured by a mercury porosimeter.

A porosity of each of the partition walls (the inner partition walls and the outer partition walls) and the circumferential wall is preferably from 35 to 70% and further preferably from 40 to 65%. When the porosity is in such a range, an isostatic strength can be acquired so that the honeycomb structure can be canned while decreasing a permeation resistance in a case where the exhaust gas permeates the partition walls. This porosity is a value measured by the mercury porosimeter.

There is not any special restriction on a thickness of the partition walls (the inner partition walls and the outer partition walls). The thickness of the partition walls is, for example, preferably from 64 to 305 μm. When the thickness of the partition walls is smaller than 64 μm, an isostatic strength remarkably may deteriorate and the honeycomb structure may be broken during the canning. On the other hand, when the thickness is in excess of 305 μm, a noticeable increase of the pressure loss may bring about, for example, the adverse effects that a fuel efficiency deteriorates and that an output cannot sufficiently be obtained. Further, it is preferable that the thickness of the outer partition walls of the outer honeycomb structure body is larger than the thickness of the inner partition walls of the inner honeycomb structure body. Specifically, a ratio of the thickness of the outer partition walls to the thickness of the inner partition walls (the thickness of the outer partition walls/the thickness of the inner partition walls) is preferably from 1.1 to 5.0 and further preferably from 1.2 to 3.5. When the ratio of the thickness of the outer partition walls to the thickness of the inner partition walls (the thickness of the outer partition walls/the thickness of the inner partition walls) is in excess of 5.0, a large difference is made in extrusion rate between each outer partition wall and each inner partition wall during extrusion of the honeycomb structure. Consequently, a deformation of the partition walls may occur in a boundary portion to deteriorate the isostatic strength.

The thickness of the outer partition walls is, for example, preferably from 110 to 381 μm and further preferably from 152 to 305 μm.

There is not any special restriction on the thickness of the circumferential wall. The thickness of the circumferential wall is, for example, preferably from 0.3 to 3 mm. When the thickness of the circumferential wall is smaller than 0.3 mm, small holes or cracks are easily generated in the circumferential wall, and the catalyst may leak from the circumferential wall during the applying of the catalyst. On the other hand, when the thickness is in excess of 3 mm, a flow of a kneaded material which forms the circumferential wall is faster than that of a kneaded material which forms another portion during the extrusion of the honeycomb structure. Therefore, a difference in flow is made between the circumferential wall and the adjacent partition wall (the inner partition wall or the outer partition wall), and the partition walls may be deformed to remarkably deteriorate the isostatic strength.

It is preferable that the circumferential wall of the inner honeycomb structure body is formed integrally with the inner partition walls of the inner honeycomb structure body. This allows a difference in thermal expansion between the circumferential wall and each inner partition wall to be reduced, and a structure to be excellent in thermal shock resistance. Here, when the circumferential wall is "formed integrally with the inner partition walls", it is not meant that the circumferential wall and the inner partition wall are fixed to each other by a method such as bonding, but it is meant that, for example, the circumferential wall is formed integrally with the inner partition walls during the extrusion in a manufacturing stage.

There is not any special restriction on a cell density of the honeycomb structure. Here, it is preferable that the cell density of the outer honeycomb structure body is smaller than the cell density of the inner honeycomb structure body. Specifically, the cell density of the inner honeycomb structure body is preferably from 46.5 to 186 cells/cm$^2$ and the cell density of the outer honeycomb structure body is preferably from 7.7 to 46.5 cells/cm$^2$. This allows the inner honeycomb structure body to acquire a geometric surface area to improve a purifying performance of the exhaust gas, and allows the outer honeycomb structure body to reduce the pressure loss.

As a material of the honeycomb structure, a ceramic material is preferable, the ceramic material is excellent in strength and heat resistance, and examples of the ceramic material include silicon carbide, cordierite, aluminum titanate, a silicon-silicon carbide based composite material, a silicon carbide-cordierite based composite material, mullite, alumina, and silicon nitride. The material of the honeycomb structure is preferably at least one selected from the group consisting of silicon carbide, cordierite, aluminum titanate, the silicon-silicon carbide based composite material, and the silicon carbide-cordierite based composite material.

Furthermore, the honeycomb structure may be a bonded body including a plurality of honeycomb segments (a honeycomb segment bonded body). That is, the honeycomb structure may include an assembly of the plurality of honeycomb segments, and bonding portions made of bonding materials to bond these honeycomb segments to one another.

There is not any special restriction on the plugging portions as long as the plugging portions are arranged in parts of the cells as described above. Here, it is preferable that the plugging portions are not arranged in the inner honeycomb structure body or are arranged only in one end portion of the inner honeycomb structure body, and that the plugging portions are arranged only in one of end portions of the outer honeycomb structure body or arranged in both of the end portions. When the plugging portions are arranged in this manner, it is possible to obtain a filter structure in which the increase of the pressure loss is minimized in accordance with a required trapping efficiency. It is to be noted that a material of the plugging portions can be similar to the above-mentioned material of the honeycomb structure. Furthermore, a depth of each plugging portion can suitably be determined.

As arrangement patterns of the plugging portions, such patterns (1) to (7) as mentioned below are preferably employed.

Figure 5A:
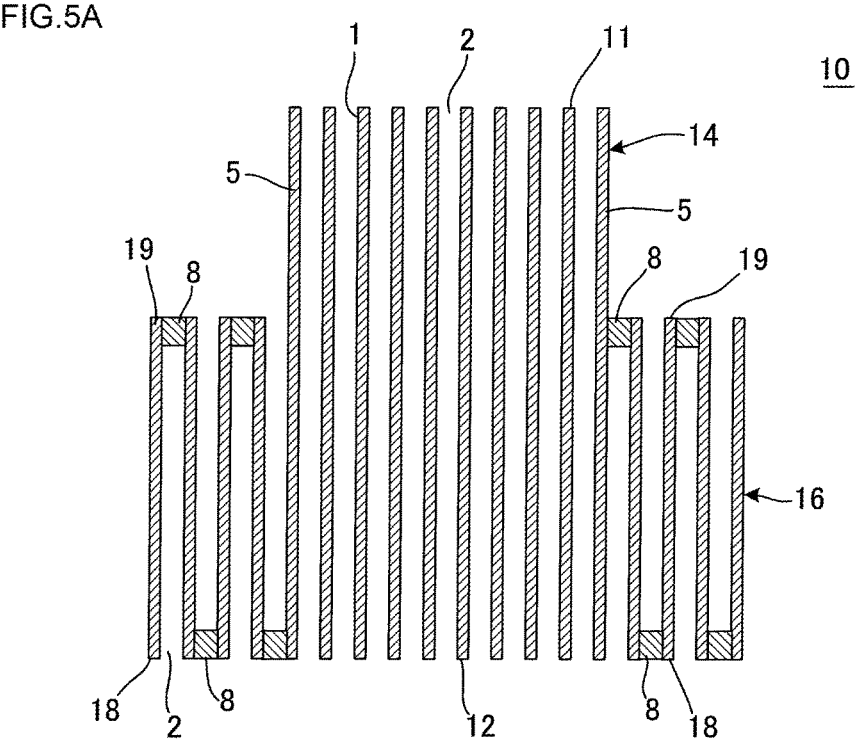
FIG. 5A is an explanatory view to explain an arrangement pattern of plugging portions in the honeycomb structure included in one embodiment of the exhaust gas treating device of the present invention.

(1) As shown in FIG. 5A, the plugging portions 8 are arranged in end portions of predetermined cells on the side of the outer inflow end face 18 and end portions of the residual cells on the side of the outer outflow end face 19 in the cells 2 of the outer honeycomb structure body 16, and the plugging portions are not arranged in the inner honeycomb structure body 14.

Figure 5B:
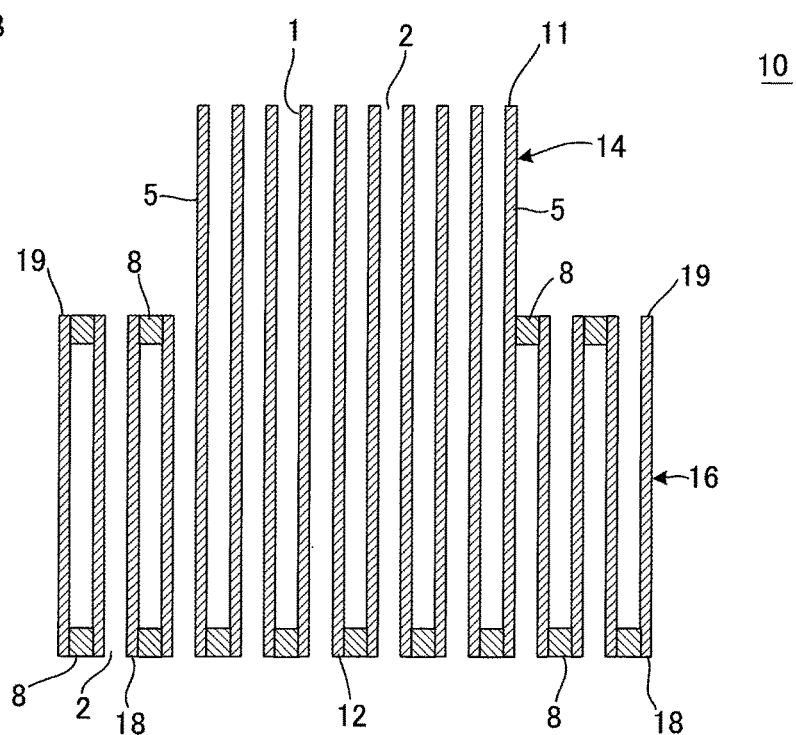
FIG. 5B is an explanatory view to explain an arrangement pattern of plugging portions in a honeycomb structure included in another embodiment of the exhaust gas treating device of the present invention.

(2) As shown in FIG. 5B, the plugging portions 8 are arranged in end portions of predetermined cells on the side of the outer inflow end face 18 and end portions of the residual cells on the side of the outer outflow end face 19 in the cells of the outer honeycomb structure body 16. Further, the plugging portions 8 are arranged only in end portions of predetermined cells on the side of the inner outflow end face 12 in the inner honeycomb structure body 14. The plugging portions 8 are not arranged in end portions of the residual cells on the side of the inner inflow end face 11 in the inner honeycomb structure body 14.

Figure 5C:
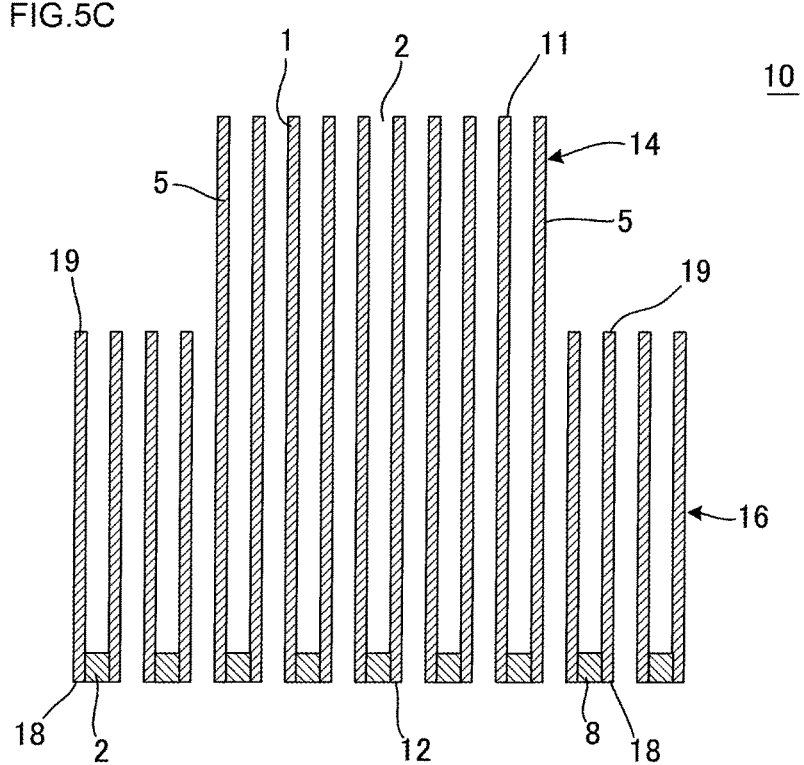
FIG. 5C is an explanatory view to explain an arrangement pattern of plugging portions in a honeycomb structure included in still another embodiment of the exhaust gas treating device of the present invention.

(3) As shown in FIG. 5C, the plugging portions 8 are arranged only in end portions of predetermined cells on the side of the inner outflow end face 12 in the inner honeycomb structure body 14. The plugging portions 8 are arranged only in end portions of predetermined cells on the side of the outer inflow end face 18 in the outer honeycomb structure body 16. The plugging portions 8 are not arranged in end portions of the residual cells on the side of the inner inflow end face 11 in the inner honeycomb structure body 14, and the plugging portions are not arranged in end portions of the residual cells on the side of the outer outflow end face 19 in the outer honeycomb structure body 16.

Figure 5D:
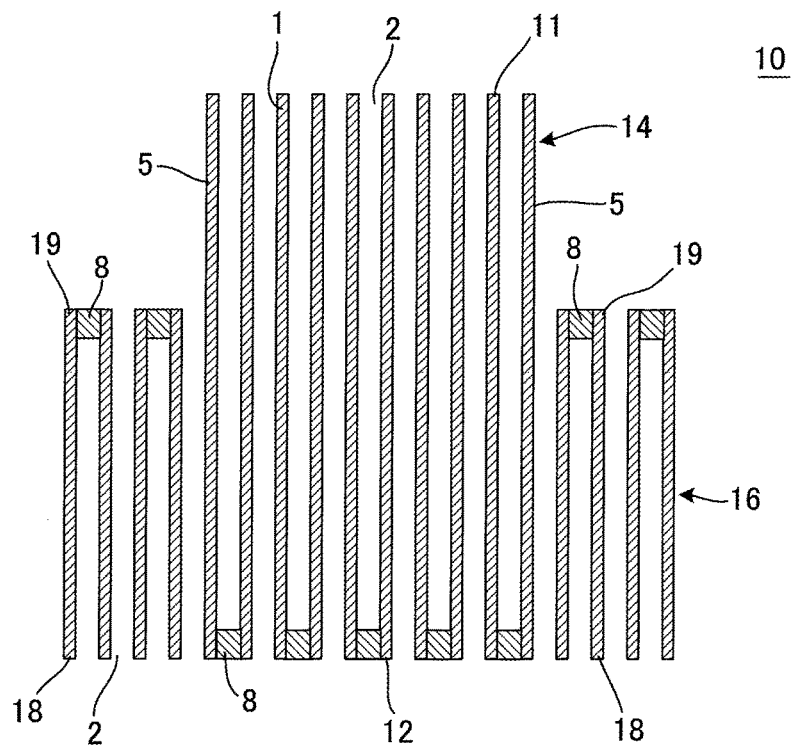
FIG. 5D is an explanatory view to explain an arrangement pattern of plugging portions in a honeycomb structure included in still another embodiment of the exhaust gas treating device of the present invention.

(4) As shown in FIG. 5D, the plugging portions 8 are arranged only in end portions of predetermined cells on the side of the inner outflow end face 12 in the inner honeycomb structure body 14. Further, the plugging portions 8 are arranged only in end portions of predetermined cells on the side of the outer outflow end face 19 in the outer honeycomb structure body 16. The plugging portions 8 are not arranged in end portions of the residual cells on the side of the inner inflow end face 11 in the inner honeycomb structure body 14, and the plugging portions are not arranged in end portions of the residual cells on the side of the outer inflow end face 18 in the outer honeycomb structure body 16.

Figure 5E:
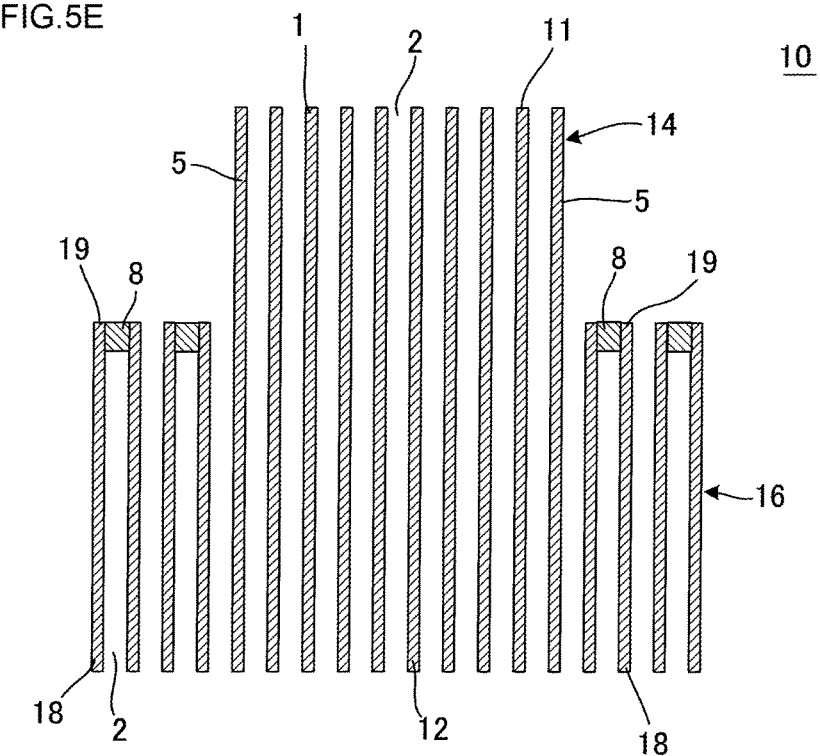
FIG. 5E is an explanatory view to explain an arrangement pattern of plugging portions in a honeycomb structure included in still another embodiment of the exhaust gas treating device of the present invention.

(5) As shown in FIG. 5E, the plugging portions 8 are arranged only in end portions of predetermined cells on the side of the outer outflow end face 19 in the outer honeycomb structure body 16, and are not arranged in the inner honeycomb structure body 14. In the outer honeycomb structure body 16, the plugging portions are not arranged in end portions of the residual cells on the side of the outer inflow end face 18.

Figure 5F:
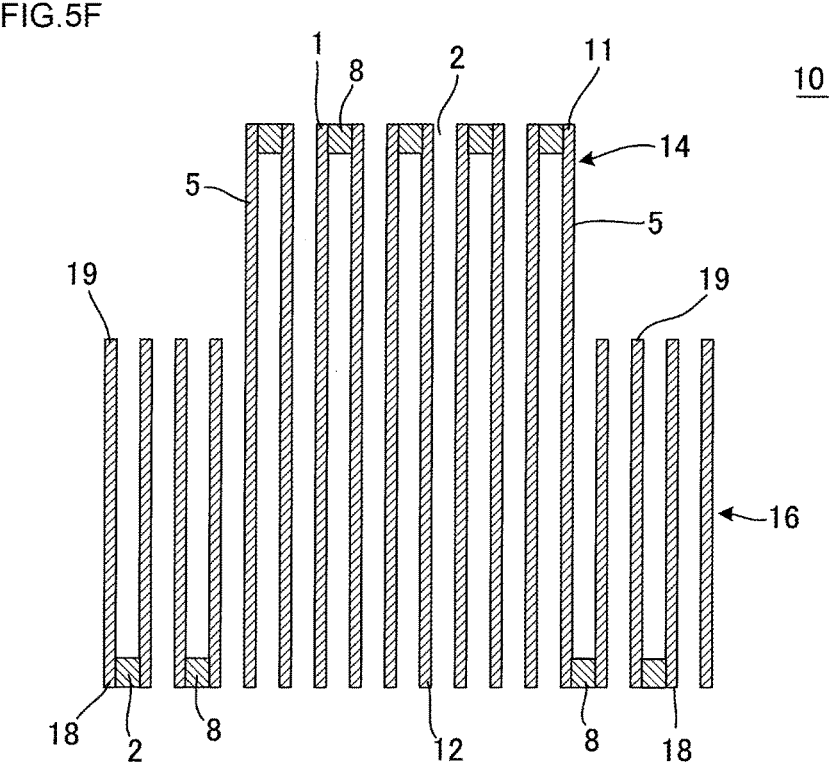
FIG. 5F is an explanatory view to explain an arrangement pattern of plugging portions in a honeycomb structure included in still another embodiment of the exhaust gas treating device of the present invention.

(6) As shown in FIG. 5F, the plugging portions 8 are arranged only in end portions of predetermined cells on the side of the inner inflow end face 11 in the inner honeycomb structure body 14. The plugging portions 8 are arranged only in end portions of predetermined cells on the side of the outer inflow end face 18 in the outer honeycomb structure body 16. The plugging portions 8 are not arranged in end portions of the residual cells on the side of the inner outflow end face 12 in the inner honeycomb structure body 14, and are not arranged in end portions of the residual cells on the side of the outer outflow end face 19 in the outer honeycomb structure body 16.

Figure 5G:
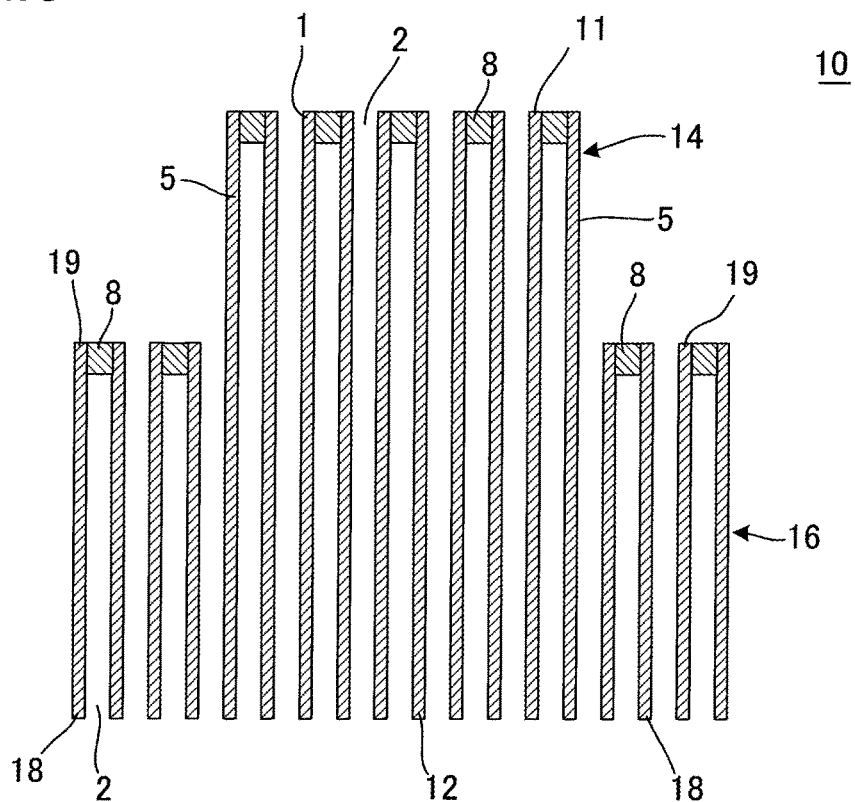
FIG. 5G is an explanatory view to explain an arrangement pattern of plugging portions in a honeycomb structure included in still another embodiment of the exhaust gas treating device of the present invention.

(7) As shown in FIG. 5G, the plugging portions 8 are arranged only in end portions of predetermined cells on the side of the inner inflow end face 11 in the inner honeycomb structure body 14. The plugging portions 8 are arranged only in end portions of predetermined cells on the side of the outer outflow end face 19 in the outer honeycomb structure body 16. The plugging portions 8 are not arranged in end portions of the residual cells on the side of the inner outflow end face 12 in the inner honeycomb structure body 14, and are not arranged in end portions of the residual cells on the side of the outer inflow end face 18 in the outer honeycomb structure body 16.

FIG. 5A is an explanatory view to explain the arrangement pattern of the plugging portions in the honeycomb structure included in one embodiment of the exhaust gas treating device of the present invention. FIG. 5B is an explanatory view to explain an arrangement pattern of plugging portions in a honeycomb structure included in another embodiment of the exhaust gas treating device of the present invention. FIG. 5C is an explanatory view to explain an arrangement pattern of plugging portions in a honeycomb structure included in still another embodiment of the exhaust gas treating device of the present invention. FIG. 5D is an explanatory view to explain an arrangement pattern of plugging portions in a honeycomb structure included in still another embodiment of the exhaust gas treating device of the present invention. FIG. 5E is an explanatory view to explain an arrangement pattern of plugging portions in a honeycomb structure included in still another embodiment of the exhaust gas treating device of the present invention. FIG. 5F is an explanatory view to explain an arrangement pattern of plugging portions in a honeycomb structure included in still another embodiment of the exhaust gas treating device of the present invention. FIG. 5G is an explanatory view to explain an arrangement pattern of plugging portions in a honeycomb structure included in still another embodiment of the exhaust gas treating device of the present invention.

It is preferable that, as shown in FIG. 1, the honeycomb structure 10 is disposed so that the outer outflow end face 19 of the outer honeycomb structure body 16 faces downward and so that the cell extending direction is parallel to a vertical direction. This disposition of the honeycomb structure 10 allows the ash trapped in the honeycomb structure 10 to be emitted due to its own weight or vibration of the car or the like. Therefore, in the exhaust gas treating device of the present invention, an operation of periodically removing the ash is not required. That is, The exhaust gas treating device 100 allows the ash in the honeycomb structure 10 to be suitably removed also along the above reverse flow generated in the honeycomb structure 10 as described above.

[1-2] Can Member:

As described above, the can member 20 includes the inflow tube 23 which fits with the end portion of the inner honeycomb structure body 14 on the side of the inner inflow end face 11 and in which the inlet 21 is formed, and the barrel portion 25 which is continuous with the inflow tube 23. Further in the barrel portion 25, the first outlet 52 of the exhaust gas is formed at the position between the inner inflow end face 11 of the inner honeycomb structure body 14 and the outer outflow end face 19 of the outer honeycomb structure body 16. Further, the second outlet 27 of the exhaust gas is formed at the position which faces the second end face 10b of the honeycomb structure 10. The can member 20 is used and furthermore, the opening/closing valve 51 is closed and the second valve 55 is opened, whereby the exhaust gas flowing into the exhaust gas treating device 100 flows as shown by the arrows in FIG. 2. That is, the exhaust gas emitted from the outer honeycomb structure body 16 directly hits on the circumferential wall 5 of the inner honeycomb structure body 14. Therefore, the convex portion 14a is heated from its outside by the above exhaust gas. This allows the exhaust gas treating device 100 to be easily heated and hard to be rapidly cooled. Furthermore, the exhaust gas flows along the above-mentioned route in the can member 20, and hence the exhaust gas treating device 100 can be downsized as a whole.

In the exhaust gas treating device of the present invention, the outlet is formed at the above position of the barrel portion of the can member, and hence the exhaust gas passing through the honeycomb structure flows to directly hit on a circumference of the above convex portion of the inner honeycomb structure body. Therefore, the exhaust gas treating device of the present invention is kept warm by the exhaust gas, and the honeycomb structure is easily heated and hard to be rapidly cooled.

A width in the return space 41 (i.e., a distance L between the honeycomb structure 10 and an inner surface of the can member 20) is preferably from 20 to 150 mm and further preferably from 30 to 100 mm. When the width is in such ranges, the through channel of the exhaust gas can be acquired to suppress the increase of the pressure loss.

It is preferable that in the can member 20, an outlet 28 for EGR which connects with a route to recirculate the exhaust gas is formed at a position between the inner inflow end face 11 of the inner honeycomb structure body 14 and the outer outflow end face 19 of the outer honeycomb structure body 16. In this way, when the can member 20 is coupled with the route to recirculate the exhaust gas, the exhaust gas from which the soot is trapped can be supplied for the EGR, and hence clogging with the soot in an EGR cooler or the like can be suppressed. Furthermore, a part of the exhaust gas is supplied from the circumferential wall 5 to the space between the inner inflow end face 11 of the inner honeycomb structure body 14 and the outer outflow end face 19 of the outer honeycomb structure body 16, and hence a pressure of the exhaust gas in the outlet 28 for EGR can be kept comparatively high. As a result, an amount of the exhaust gas to be supplied for the EGR can be acquired. It is to be noted that the EGR is an abbreviation for Exhaust Gas Recirculation.

A material of the can member 20 can be the same material as in a can member to be employed in a heretofore known exhaust gas treating device.

[1-3] Opening/Closing Valve:

The opening/closing valve 51 is disposed in the second outlet 27 of the can member 20 to open and close the second outlet 27. When the opening/closing valve 51 is closed, the exhaust gas flows as shown in FIG. 2. That is, the exhaust gas permeating the inner honeycomb structure body 14 flows into the outer honeycomb structure body 16. It is to be noted that the opening/closing valve 51 does not completely close the exhaust pipe 57. That is, the opening/closing valve 51 is required to disturb the flow of the exhaust gas.

As the opening/closing valve, a heretofore known opening/closing type valve can be used.

[1-4] Bypass Pipe and Second Valve:

It is preferable that the exhaust gas treating device of the present invention includes the bypass pipe in which one end portion is coupled with the first outlet of the barrel portion and the other end portion is coupled with a position behind the opening/closing valve in the exhaust pipe coupled with the second outlet of the barrel portion. Furthermore, it is preferable that the exhaust gas treating device of the present invention includes the second valve disposed in the bypass pipe. Thus, the exhaust gas treating device 100 includes the bypass pipe 53 and the second valve 55, whereby the through channel of the exhaust gas can be easily changed between a specific operation region such as the start of the engine and another operation region. FIG. 2 shows that the exhaust gas emitted from the honeycomb structure 10 passes through the bypass pipe 53 and flows into the exhaust pipe 57 in a state where the second valve 55 is opened.

[1-5] Sound Absorbing Material:

In the exhaust gas treating device of the present invention, it is preferable that a sound absorbing material is disposed in a clearance between the second end face of the honeycomb structure and the can member. The sound absorbing material is a mat made of glass fibers or the like and having heat resistance. Thus, the sound absorbing material is disposed as described above, so that there is the advantage that the same silencing effect as in a muffler can be obtained.

Examples of the sound absorbing material include glass wool and metal fibers. Above all, the glass wool is preferable from a viewpoint of having the heat resistance.

[2] Manufacturing Method of Honeycomb Structure:

A manufacturing method of the honeycomb structure includes a honeycomb formed body preparing step of preparing a honeycomb formed body; a plugging arrangement step of forming plugging portions in the prepared honeycomb formed body; a firing step of firing the prepared plugged honeycomb formed body to obtain a honeycomb fired body; and a honeycomb structure preparing step of exposing a part of a dividing wall, thereby obtaining the honeycomb structure. The honeycomb formed body in the honeycomb formed body preparing step includes partition walls defining a plurality of cells extending from an inflow end face which is one end face to an outflow end face which is the other end face, and the dividing wall which divides a cross section perpendicular to an extending direction of the cells into an outer portion and an inner portion. In the honeycomb structure preparing step, a part of an outer portion of the honeycomb fired body obtained in the firing step is ground from the one end face to expose a part of the dividing wall.

Such a manufacturing method can suitably provide the honeycomb structure which is usable in the exhaust gas treating device of the present invention. Specifically, in the present manufacturing method, the honeycomb formed body having the dividing wall is prepared in the honeycomb formed body preparing step, this honeycomb formed body is fired to obtain the honeycomb fired body, and then the honeycomb fired body is ground to expose the dividing wall (the circumferential wall). This allows the circumferential wall (the dividing wall) to be disposed at the circumference of the inner inflow end portion of the obtained honeycomb structure. That is, when the dividing wall is not disposed in the honeycomb formed body preparing step, the ground partition walls are exposed in the honeycomb structure. Further, parts of the partition walls peel off.

The honeycomb structure having the circumferential wall (the dividing wall) can prevent from peeling off parts of the partition walls. Furthermore, in the above manufacturing method, the inner inflow end portion of the honeycomb structure is ground outside, and the inner inflow end portion having the circumferential wall can be easily prepared.

[2-1] Honeycomb Formed Body Preparing Step:

Specifically, in the present step, a forming raw material is first kneaded to obtain a kneaded material. The forming raw material is preferably obtained by adding a dispersing medium and an additive to a ceramic raw material. Examples of the additive include an organic binder, a pore former, and a surfactant or the like. An example of the dispersing medium is water or the like.

It is preferable that the ceramic raw material is at least one selected from the group consisting of a cordierite forming raw material, mullite, alumina, spinel, silicon carbide, a silicon-silicon carbide based composite material, a silicon carbide-cordierite based composite material, lithium aluminum silicate, and aluminum titanate. Above all, the cordierite forming raw material is preferable because this material has a smaller thermal expansion coefficient and is excellent in thermal shock resistance.

The honeycomb structure having a desirable porosity and a desirable average pore diameter can be obtained by adjusting particle diameters and a blending amount of the ceramic raw material for use, and particle diameters and a blending amount of the pore former to be added.

There is not any special restriction on a method of kneading the forming raw material to form the kneaded material, and an example of the method includes a method in which a kneader, a vacuum pugmill or the like is used.

Next, the obtained kneaded material is extruded to obtain the honeycomb formed body. At this time, a predetermined die is preferably used so that the honeycomb formed body having the partition walls and the dividing wall can be obtained. As a material of the die, a cemented carbide which is hard to be abraded is preferable.

There is not any special restriction on a thickness of the dividing wall as long as the circumferential wall having a desirable thickness can be obtained after the honeycomb formed body is fired. The thickness of the dividing wall can be, for example, from 1 to 3 mm.

[2-2] Plugging Arrangement Step:

Next, open ends of cells of a honeycomb structure body of the obtained honeycomb fired body are plugged by a plugging material. An example of a method of plugging the open ends of the cells includes a method of charging the open ends of the cells with the plugging material. The method of charging the open ends of the cells with the plugging material can be carried out according to a heretofore known manufacturing method of a plugged honeycomb structure. As the ceramic raw material to form the plugging material, a ceramic raw material for use in the heretofore known manufacturing method of the honeycomb structure can be used. Further, as the ceramic raw material to form the plugging material, the same ceramic raw material as that used in the preparation of the honeycomb formed body is preferably used. It is to be noted that to adjust a porosity, pore diameters and the like of plugging portions formed by the plugging material, particle diameters and a blending amount of ceramic raw material powder and particle diameters and a blending amount of pore former powder to be added may be suitably changed.

The open ends of the cells are charged with the plugging material and then the plugging material is dried or fired, whereby the honeycomb structure of the present embodiment can be manufactured. A step of charging the open ends of the cells with the plugging material may be performed before the honeycomb formed body is fired. The manufacturing method of the honeycomb structure of the present embodiment is not limited to the hitherto described method.

[2-3] Firing Step:

Next, the honeycomb formed body is fired to obtain the honeycomb fired body (a firing step). A firing temperature can be suitably determined in accordance with the material of the honeycomb formed body. For example, when the material of the honeycomb formed body is cordierite, a firing temperature is preferably from 1380 to 1450° C. and further preferably from 1400 to 1440° C. Furthermore, a firing time is defined as a time to retain the maximum temperature, and is preferably from about 4 to 6 hours.

The honeycomb formed body may be dried before it is fired. There is not any special restriction on a drying method. Examples of the drying method include hot air drying, microwave drying, induction drying, reduced pressure drying, vacuum drying and freeze drying. Above all, it is preferable that the induction drying, the microwave drying or the hot air drying is performed alone or any combination of them is performed. Furthermore, as drying conditions, it is preferable that a drying temperature is from 30 to 150° C. and a drying time is from 1 minute to 2 hours.

[2-4] Honeycomb Structure Preparing Step:

Next, a part of an outer portion of the obtained honeycomb fired body is ground from one end face to expose a part of the dividing wall, thereby preparing the honeycomb structure including the partition walls and the dividing wall (the circumferential wall). The honeycomb fired body may be ground after the honeycomb formed body is dried and before the honeycomb formed body is fired.

[3] Manufacturing Method of Exhaust Gas Treating Device:

The exhaust gas treating device of the present embodiment can be prepared by storing the manufactured honeycomb structure in the above can member in which the opening/closing valve is disposed.

As shown in FIG. 2, the exhaust gas flows through the exhaust gas treating device prepared as described above by closing the opening/closing valve at the start of the engine. That is, in the exhaust gas treating device 100, the exhaust gas flows into the honeycomb structure 10 from the side of the inner inflow end face 11 of the inner honeycomb structure body 14 of the honeycomb structure 10, and flows out from the inner outflow end face 12 of the inner honeycomb structure body 14. Afterward, the exhaust gas flowing into the return space 41 flows into the outer honeycomb structure body 16 from the side of the outer inflow end face 18 of the outer honeycomb structure body 16, and flows out from the outer outflow end face 19. At this time, the exhaust gas flowing out from the outer outflow end face 19 of the outer honeycomb structure body 16 is introduced into the space (the temperature raising assistance space) 43 between the circumferential wall 5 of the inner honeycomb structure body 14 and the barrel portion 25 of the can member 20, and is emitted from the second outlet 27 of the can member 20 while coming into contact with the circumferential wall 5.

Furthermore, in this exhaust gas treating device, after the elapse of the initial stage of the start of the engine, as shown in FIG. 3, the opening/closing valve 51 is opened, and the exhaust gas passing through the honeycomb structure 10 is emitted to the outside of the can member 20.

[4] Temperature Raising Method of Catalyst:

A temperature raising method of the catalyst of the present invention is the temperature raising method of the catalyst loaded onto the honeycomb structure of the exhaust gas treating device of the present invention. That is, in the temperature raising method of the catalyst of the present invention, the opening/closing valve 51 of the exhaust gas treating device is closed, and the exhaust gas emitted from the inner outflow end face 12 of the inner honeycomb structure body 14 flows into the outer honeycomb structure body 16 from the side of the outer inflow end face 18 of the outer honeycomb structure body 16. Further, the exhaust gas flowing into the outer honeycomb structure body 16 flows out from the outer outflow end face 19. The exhaust gas emitted from the outer honeycomb structure body 16 directly hits on the circumferential wall 5 of the inner honeycomb structure body 14, thereby raising the temperature of the catalyst loaded onto the honeycomb structure. It is to be noted that at this time, the second valve 55 is opened as shown in FIG. 2.

Furthermore, when the second valve 55 is closed in the state where the opening/closing valve 51 is closed, the temperature of the catalyst loaded onto the honeycomb structure can be suitably raised. Specifically, as shown in FIG. 2, when the opening/closing valve 51 and the second valve 55 of the exhaust gas treating device 100 are closed, a pressure of the exhaust gas in the can member 20 increases. Further, when the pressure of the exhaust gas in the can member 20 increases, a volume of the can member 20 does not change, and hence a temperature of the exhaust gas rises. This allows the temperature of the catalyst which comes in contact with the exhaust gas to be raised.

It is to be noted that the honeycomb structure onto which the catalyst is loaded can be obtained by coating the honeycomb structure with the catalyst in a heretofore known method.

Another temperature raising method of the catalyst is such a method as mentioned below. That is, by raising the pressure of the exhaust gas in the can member of the exhaust gas treating device by a supercharger and raising the temperature of the exhaust gas, the temperature of the catalyst loaded onto the honeycomb structure is raised. Such a method allows the temperature of the catalyst loaded onto the honeycomb structure to be suitably raised.

In the present method, differently from the above method, the pressure of the exhaust gas in the can member of the exhaust gas treating device is raised by using the supercharger. Therefore, the opening/closing valve of the exhaust gas treating device does not have to be completely closed. It is to be noted that the opening/closing valve of the exhaust gas treating device is preferably completely closed from a viewpoint of easily raising the pressure of the exhaust gas in the can member.

Specifically, the supercharger can be used as follows. That is, a supply port to be coupled with the supercharger is formed in the barrel portion of the can member, and the pressurized exhaust gas is supplied from this supply port by the supercharger (the supercharger to electrically be driven) which operates by, for example, an electric power source. Such a method allows the exhaust gas to be acquired so that an amount of the exhaust gas increases, and the pressure to be comparatively quickly raised. That is, the temperature of the exhaust gas can be rapidly raised.

[5] Regeneration Method of Honeycomb Structure:

A regeneration method of the honeycomb structure of the present invention is the regeneration method of the honeycomb structure in a state where the soot is deposited in the honeycomb structure of the exhaust gas treating device of the present invention. That is, the regeneration method of the honeycomb structure of the present invention includes preparing the exhaust gas treating device including the honeycomb structure in which the soot is deposited, and then closing the opening/closing valve and the second valve of the exhaust gas treating device to raise the pressure of the exhaust gas in the can member of the exhaust gas treating device. The temperature of the exhaust gas in the can member is raised in this manner to burn the soot. This burning of the soot allows the honeycomb structure to be regenerated. It is to be noted that when the opening/closing valve is completely closed, the second valve does not have to be completely closed.

Such a method allows the honeycomb structure in which the soot is deposited to be suitably regenerated.

Another regeneration method of the honeycomb structure is the following method. That is, by raising the pressure of the exhaust gas in the can member of the exhaust gas treating device by a supercharger and raising the temperature of the exhaust gas, the soot is burnt. Such a method allows the soot to be burnt, and the honeycomb structure to be regenerated. It is to be noted that in this case, the opening/closing valve of the exhaust gas treating device may be opened or closed.

[6] Ash Removing Method:

An ash removing method of the present invention is the ash removing method of removing the ash in the honeycomb structure in a state where the ash is deposited in the honeycomb structure of the exhaust gas treating device of the present invention. That is, as shown in FIG. 3, in the ash removing method of the present invention, opening the opening/closing valve 51 while closing the second valve 55 in the exhaust gas treating device 100 causes a flow of a fluid from the outer outflow end face 19 of the outer honeycomb structure body 16 of the honeycomb structure 10 toward the outer inflow end face 18 to be generated. This operation allows the ash deposited in the outer honeycomb structure body 16 of the honeycomb structure 10 to be removed.

Such a method allows the ash to be suitably removed from the honeycomb structure in which the ash is deposited. That is, when the exhaust gas treating device is brought into the above state, a negative pressure is generated in the honeycomb structure 10, and hence in the honeycomb structure 10, a flow (reverse flow) of the exhaust gas toward the side of the outer inflow end face 18 from the side of the outer outflow end face 19 in the outer honeycomb structure body 16 is generated. Thus, the reverse flow is generated in the honeycomb structure 10, whereby the ash accumulated in the honeycomb structure 10 can be emitted from the exhaust gas treating device 100. That is, in the exhaust gas treating device 100, the backwashing of the honeycomb structure 10 can be carried out by the above reverse flow.

EXAMPLES

Hereinafter, the present invention will specifically be described on the basis of examples, but the present invention is not limited to these examples.

Example 1

To 100 parts by mass of cordierite forming raw material, there were added 13 parts by mass of pore former, 35 parts by mass of dispersing medium, 6 parts by mass of organic binder, and 0.5 parts by mass of dispersing agent, which was followed by mixing and kneading to prepare a kneaded material. As the cordierite forming raw material, alumina, aluminum hydroxide, kaolin, talc and silica were used. Water was used as the dispersing medium, coke having an average particle diameter of 1 to 10 µm was used as the pore former, hydroxypropylmethylcellulose was used as the organic binder and ethylene glycol was used as the dispersing agent. Particle diameters and an amount of the pore former were controlled to control pore diameters and a porosity of partition walls.

Next, the kneaded material was extruded by using a predetermined die to obtain a honeycomb formed body having partition walls and a dividing wall, so that the round pillar-shaped honeycomb formed body was obtained.

Next, the honeycomb formed body was dried with a microwave drier and further dried completely with a hot air drier, followed by cutting both end faces of the honeycomb formed body to adjust the honeycomb formed body into a predetermined dimension.

Next, one open end of each cell of the honeycomb formed body was charged with a plugging slurry to form each plugging portion.

An arrangement pattern of the plugging portions shown in FIG. 5A was employed. Specifically, in the plugged honeycomb formed body, the plugging portions were arranged in end portions of predetermined cells on the side of an outer inflow end face and end portions of the residual cells on the side of an outer outflow end face in the cells of an outer honeycomb structure body, and the plugging portions were not arranged in an inner honeycomb structure body.

In a forming method of the plugging portions, a sheet was first attached to each of one end face and the other end face of a portion corresponding to the outer honeycomb structure body of the honeycomb formed body, and holes were made at positions of this sheet which corresponded to the cells in which the plugging portions were to be formed. Next, in a state where this sheet remained to be attached, the plugging slurry was applied to the above end face of the honeycomb formed body to push the slurry into the honeycomb formed body, and the predetermined cells of the honeycomb formed body were charged with the plugging slurry. As the plugging slurry, a slurry in which a material constituting the plugging portion is slurried was used.

Afterward, the plugged honeycomb formed body was dried with the hot air drier, and further fired at 1410 to 1440° C. for 5 hours to obtain a honeycomb fired body.

Next, a part of an outer portion of the honeycomb fired body was ground from the one end face to expose a part of the dividing wall, thereby obtaining a honeycomb structure.

A length of the honeycomb structure in an extending direction of the cells was 140 mm (Table 2 shows the length as "a system total length"). A length of the outer honeycomb structure body in the cell extending direction was 100 mm. A length of a convex portion of the inner honeycomb structure body in the cell extending direction was 40 mm. Furthermore, in the honeycomb structure, the inner honeycomb structure body and the outer honeycomb structure body had a round pillar shape, a diameter of the inner honeycomb structure body was 80 mm, and a diameter of a total (a second end face) of the inner honeycomb structure body and the outer honeycomb structure body was 144 mm.

Furthermore, in the honeycomb structure, a cell density of the inner honeycomb structure body was 46.5 cells/cm$^2$. Specifically, a cell density of the convex portion of the inner honeycomb structure body was equal to a cell density of a portion other than the convex portion (the portion covered with the outer honeycomb structure body). A cell density of the outer honeycomb structure body was 46.5 cells/cm$^2$. A thickness of outer partition walls (the partition walls of the outer honeycomb structure body) was 0.21 mm and a thickness of inner partition walls (the inner honeycomb structure body) was 0.21 mm. A circumferential wall of the inner honeycomb structure body was formed integrally with the inner partition walls of the inner honeycomb structure body.

Next, the obtained honeycomb structure was stored in a can member. A cushioning member constituted of a ceramic mat was disposed in a space between the honeycomb structure and the can member. As the can member, a can member including an inflow tube which fitted with an end portion of the inner honeycomb structure body on the side of an inner inflow end face and in which an inlet was formed, and a barrel portion which was continuous with this inflow tube was used. Further, in this barrel portion of the can member, a first outlet of the exhaust gas was formed at a position between the inner inflow end face of the inner honeycomb structure body and the outer outflow end face of the outer honeycomb structure body. Further in this can member, a second outlet of the exhaust gas was formed at a position which faced the second end face of the honeycomb structure. Furthermore, the can member made of stainless steel was used. The can member in which an opening/closing valve was disposed in its outlet was used. Furthermore, the outlet of the can member was coupled with a bypass pipe, and in this bypass pipe, a second valve to open and close its through channel was disposed. Furthermore, an outlet for EGR was formed in the can member. In the prepared exhaust gas treating device, a return space and a temperature raising assistance space were formed.

As described above, the exhaust gas treating device was obtained.

Next, as to the obtained exhaust gas treating device, evaluations of "the system total length", "pressure loss during a steady operation", "a purifying ratio", "PM trapping" and "an amount of ash deposited after running of 160,000 km" were performed by methods mentioned below. Table 2 shows the results.

[System Total Length]

A distance from an inflow end face for the exhaust gas to the farthest position of the honeycomb structure in the cell extending direction was defined as the system total length. At this time, when the system total length was 200 mm or less, the exhaust gas treating device was noticeably evaluated as "pass". When the system total length was in excess of 200 mm, the exhaust gas treating device was noticeably evaluated as "failure".

[Pressure Loss During Steady Operation]

A pressure loss was measured when a steady operation at 2000 rpm was performed (at an exhaust gas temperature of 550° C.) in a state where the opening/closing valve (denoted with 51 in FIG. 1) was opened. The above pressure loss of an exhaust gas treating device of Comparative Example 1 was defined as a standard, a case where a degree of decrease of the pressure loss in each example was 4 kPa or more was evaluated as "A", and a case where the degree was 3 kPa or more and smaller than 4 kPa was evaluated as "B".

[Purifying Ratio]

When emissions of all components (carbon monoxide, hydrocarbons and nitrogen oxides) were compared with European regulation values of EURO6 and the emissions were lower than the regulation values, the evaluation was the pass "B", and when the emissions were not lower than the regulation values, the evaluation was the failure "C". Furthermore, in the evaluation B, a case where carbon monoxide decreased by 30% of the regulation value was evaluated as "A", and a case where carbon monoxide decreased by 50% was evaluated as "AA".

[PM Trapping]

When the number of PM particles generated from a vehicle was defined as $1.0 \times 10^{12}$ particles/km, European regulation value of $6.0 \times 10^{11}$ particles/km of EURO6 was used as a standard, and a case where the number of the PM particles in an exhaust gas trapped in the exhaust gas treating device was smaller than 40% of the above standard was evaluated as "D". Further, a case where the number of the PM particles in the exhaust gas trapped in the exhaust gas treating device was 40% or more and smaller than 60% of the above standard was evaluated as "C". Further, a case where the number of the PM particles in the exhaust gas trapped in the exhaust gas treating device was 60% or more and smaller than 80% of the above standard was evaluated as "B". Further, a case where the number of the PM particles in the exhaust gas trapped in the exhaust gas treating device was 80% or more of the above standard was evaluated as "A".

[Amount of Ash Deposited After Running of 160,000 km]

As to the obtained exhaust gas treating device, a vehicle was run on conditions that a percentage of city roads was 8%, a percentage of country roads was 11% and a percentage of highways was 81%, and the amount of the ash deposited in the honeycomb structure after the running of 160,000 km was measured. Further, the amount of the ash deposited in the exhaust gas treating device of Comparative Example 1 was measured, the measured value was defined as a standard, and a case where a decrease amount of the deposited ash was smaller than 5 g was evaluated as "D". A case where the decrease amount of the deposited ash was 5 g or more and smaller than 10 g was evaluated as "C". A case where the decrease amount of the deposited ash was 10 g or more and smaller than 20 g was evaluated as "B". A case where the decrease amount of the deposited ash was 20 g or more was evaluated as "A".

TABLE 1

| | Convex portion of inner honeycomb structure body/first honeycomb structure | | | | Inner honeycomb structure body (excluding the convex portion)/second honeycomb structure | | | |
|---|---|---|---|---|---|---|---|---|
| | Partition wall thickness (mm) | Cell density (cells/cm²) | Plugging portion | Length (mm) | Partition wall thickness (mm) | Cell density (cells/cm²) | Plugging portion | Length (mm) |
| Comparative Example 1 | 0.21 | 46.5 | None | 40 | 0.21 | 46.5 | None | 100 |
| Example 1 | 0.21 | 46.5 | None | 40 | 0.21 | 46.5 | None | 100 |
| Example 2 | 0.21 | 46.5 | None | 40 | 0.21 | 46.5 | Present (inner outflow end face side) | 100 |
| Example 3 | 0.21 | 46.5 | None | 40 | 0.21 | 46.5 | Present (inner outflow end face side) | 100 |
| Example 4 | 0.21 | 46.5 | None | 40 | 0.21 | 46.5 | Present (inner outflow end face side) | 100 |
| Example 5 | 0.21 | 46.5 | None | 40 | 0.21 | 46.5 | Present (inner inflow end face side) | 100 |
| Example 6 | 0.21 | 46.5 | None | 40 | 0.21 | 46.5 | Present (inner inflow end face side) | 100 |
| Example 7 | 0.21 | 46.5 | None | 40 | 0.21 | 46.5 | None | 100 |
| Example 8 | 0.21 | 46.5 | None | 40 | 0.21 | 46.5 | None | 100 |
| Example 9 | 0.09 | 93 | None | 40 | 0.09 | 46.5 | None | 100 |
| Example 10 | 0.21 | 46.5 | None | 40 | 0.21 | 46.5 | None | 100 |
| Example 11 | 0.21 | 46.5 | None | 40 | 0.21 | 46.5 | None | 100 |
| Reference Example 1 | 0.21 | 46.5 | None | 40 | 0.21 | 46.5 | None | 100 |

| | Outer honeycomb structure body/third honeycomb structure | | | |
|---|---|---|---|---|
| | Partition wall thickness (mm) | Cell density (cells/cm²) | Plugging portion | Length (mm) |
| Comparative Example 1 | 0.21 | 46.5 | Present in both faces | 100 |
| Example 1 | 0.21 | 46.5 | Present in both faces | 100 |
| Example 2 | 0.21 | 46.5 | Present in both faces | 100 |
| Example 3 | 0.21 | 46.5 | Present (outer inflow end face side) | 100 |
| Example 4 | 0.21 | 46.5 | Present (outer outflow end face side) | 100 |
| Example 5 | 0.21 | 46.5 | Present (outer inflow end face side) | 100 |
| Example 6 | 0.21 | 46.5 | Present (outer outflow end face side) | 100 |
| Example 7 | 0.21 | 46.5 | Present (outer inflow end face side) | 100 |
| Example 8 | 0.21 | 46.5 | Present (outer outflow end face side) | 100 |
| Example 9 | 0.21 | 46.5 | Present in both faces | 100 |
| Example 10 | 0.21 | 46.5 | Present in both faces | 100 |
| Example 11 | 0.21 | 46.5 | Present in both faces | 100 |
| Reference Example 1 | 0.21 | 46.5 | Present in both faces | 218 |

TABLE 2

|  | Valve control | Temperature raising control by closing the valve | Ash backwashing by closing the valve | System total length (mm) | Pressure loss during steady operation at 2000 rpm | Purifying ratio | PM trapping | Amount of ash deposited after running of 160,000 km |
|---|---|---|---|---|---|---|---|---|
| Comparative Example 1 | — | — | — | 140 | — | B | A | — |
| Example 1 | Present | None | None | 140 | A | B | A | B |
| Example 2 | Present | None | None | 140 | B | B | A | B |
| Example 3 | Present | None | None | 140 | B | B | B | B |
| Example 4 | Present | None | None | 140 | B | B | B | B |
| Example 5 | Present | None | None | 140 | B | B | B | C |
| Example 6 | Present | None | None | 140 | B | B | B | C |
| Example 7 | Present | None | None | 140 | A | A | C | B |
| Example 8 | Present | None | None | 140 | A | A | C | B |
| Example 9 | Present | None | None | 140 | B | AA | A | B |
| Example 10 | Present | Present | None | 140 | A | AA | A | B |
| Example 11 | Present | None | Present | 140 | A | B | A | A |
| Reference Example 1 | None | None | None | 358 | B | A | A | D |

In Table 2, a column of "valve control" shows whether or not the opening/closing valve 51 is disposed as in the exhaust gas treating device 100 shown in FIG. 1. "Present" of the column of "the valve control" shows that the opening/closing valve 51 is disposed as in the exhaust gas treating device 100 shown in FIG. 1. Furthermore, "-" of the column of the column of "the valve control" shows that such an opening/closing valve as in the exhaust gas treating device 100 shown in FIG. 1 is not disposed.

In Table 2, a column of "temperature raising control by closing the valve" shows whether or not an operation of opening and closing the second valve was performed in a state where the opening/closing valve was closed in the exhaust gas treating device. "Present" of the column of "the temperature raising control by closing the valve" shows that the operation of opening and closing the second valve was performed in the state where the opening/closing valve was closed in the exhaust gas treating device including the opening/closing valve 51 as in the exhaust gas treating device 100 shown in FIG. 1. Furthermore, "none" of the column of "the temperature raising control by closing the valve" shows that the operation of opening and closing the second valve was not performed in the state where the opening/closing valve was closed in the exhaust gas treating device including the opening/closing valve 51 as in the exhaust gas treating device 100 shown in FIG. 1. Furthermore, "-" of the column of "the temperature raising control by closing the valve" shows that such an opening/closing valve as in the exhaust gas treating device 100 shown in FIG. 1 is not disposed.

In Table 2, a column of "ash backwashing by closing the valve" shows whether or not ash removal was performed. "Present" of the column of "the ash backwashing by closing the valve" shows that the ash removal was performed. Furthermore, "none" of the column of "the ash backwashing by closing the valve" shows that the ash removal was not performed. Furthermore, "-" of the column of "the ash backwashing by closing the valve" shows that such an opening/closing valve as in the exhaust gas treating device 100 shown in FIG. 1 is not disposed. It is to be noted that the removal of the ash was performed by opening the opening/closing valve while closing the second valve in the exhaust gas treating device, to generate a flow of a fluid from the outer outflow end face of the outer honeycomb structure body of the honeycomb structure toward the outer inflow end face.

As being understood by comparison of evaluations of purifying ratios of Examples 1 and 10, when the column of "the temperature raising control by closing the valve" shows "present", the evaluation of purifying ratio is excellent. This is because the temperature of the catalyst loaded onto the honeycomb structure is suitably raised.

Furthermore, as being understood by comparison of evaluations of "the amount of the ash deposited after the running of 160,000 km" of Examples 1 and 11, when the column of "the ash backwashing by closing the valve" shows "present", the evaluation of "the amount of the ash deposited after the running of 160,000 km" is excellent. This is because the ash can be suitably removed from the honeycomb structure in which the ash is deposited.

Comparative Example 1

First, the procedure of Example 1 was repeated to prepare a honeycomb structure (see Table 1). Next, an obtained honeycomb structure 10 was stored in a can member 20 (see FIG. 6).

Figure 6:
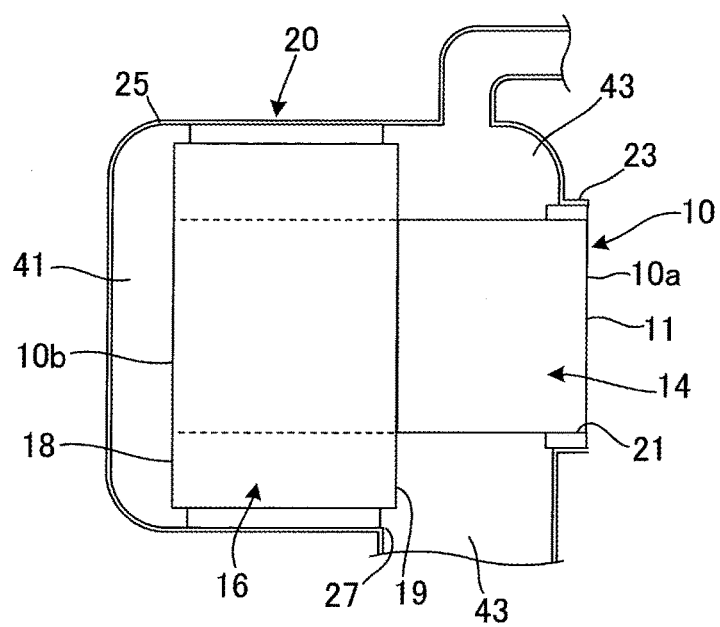
FIG. 6 is a cross-sectional view schematically showing a cross section of an exhaust gas treating device of Comparative Example 1.

As shown in FIG. 6, as the can member 20, a can member including an inflow tube 23 which fitted with an end portion of an inner honeycomb structure body 14 on the side of an inner inflow end face 11 and in which an inlet 21 of an exhaust gas was formed, and a barrel portion 25 which was continuous with the inflow tube 23 was used. Further, in the barrel portion 25 of the can member 20, a second outlet 27 of the exhaust gas was formed at a position between the inner inflow end face 11 of the inner honeycomb structure body 14 and an outer outflow end face 19 of an outer honeycomb structure body 16. Furthermore, a honeycomb structure 10 was stored in the can member 20 in a state of having a clearance (a return space) 41 which served as a through channel for the exhaust gas between a second end face 10b and the can member 20 and having a clearance (a temperature raising assistance space) 43 which served as a through channel for the exhaust gas between the outer outflow end face 19 of the outer honeycomb structure body 16 and the can member 20. Furthermore, the can member 20 made of stainless steel was used. In this way, an exhaust gas treating device 200 shown in FIG. 6 was obtained.

As to the exhaust gas treating device 200, the procedure of Example 1 was repeated to evaluate "a system total length", "pressure loss during a steady operation", "a purifying ratio", "PM trapping" and "an amount of ash deposited after running of 160,000 km". Table 2 shows the results.

Examples 2 to 11

The procedure of Example 1 was repeated except that changes were made as shown in Table 1, to evaluate "a system total length", "pressure loss during a steady operation", "a purifying ratio", "PM trapping" and "an amount of ash deposited after running of 160,000 km". Table 2 shows the results.

Reference Example 1

Figure 7:
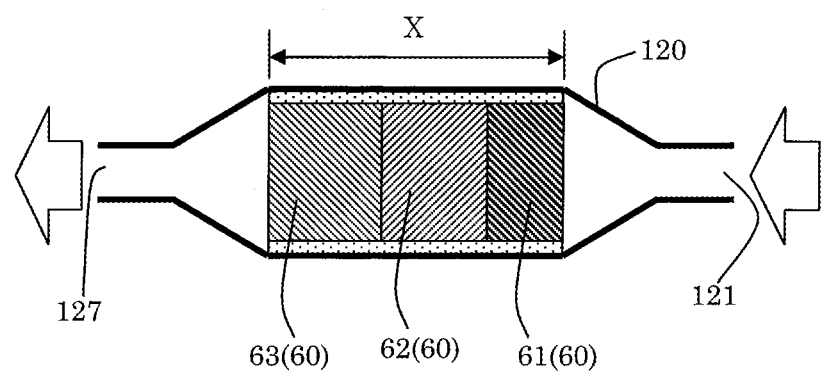
FIG. 7 is a cross-sectional view schematically showing a cross section of an exhaust gas treating device of Reference Example 1.

As to an exhaust gas treating device such as an exhaust gas treating device 300 shown in FIG. 7, the procedure of Example 1 was repeated to evaluate "a system total length", "pressure loss during a steady operation", "a purifying ratio", "PM trapping" and "an amount of ash deposited after running of 160,000 km". Table 2 shows the results.

The exhaust gas treating device 300 included a can member 120 in which an inlet 121 and an outlet 127 for an exhaust gas were formed, and a filter group 60 constituted of three honeycomb structures stored in the can member 120. The filter group 60 includes a first honeycomb structure 61, a second honeycomb structure 62 and a third honeycomb structure 63 arranged in this order from the side of the inlet 121 of the exhaust gas in the can member 120. Further, each of the honeycomb structures 61, 62 and 63 had a round pillar shape, and a diameter of the first honeycomb structure 61 was 80 mm. It is to be noted that in FIG. 7, symbol X shows a length (the system total length) of the exhaust gas treating device.

It can be seen from Table 2 that each of exhaust gas treating devices of Examples 1 to 11 can be downsized as a whole and the exhaust gas treating device is easily heated and hard to be rapidly cooled, and increase of pressure loss is suppressed as compared with exhaust gas treating devices of Comparative Example 1 and Reference Example 1.

An exhaust gas treating device of the present invention can be employed as a filter which purifies an exhaust gas emitted from a car or the like. A temperature raising method of a catalyst of the present invention can be employed as a method of raising a temperature of the catalyst loaded onto the above filter. A regeneration method of a honeycomb structure of the present invention can be employed as a method of removing a soot deposited in the above filter, thereby regenerating the filter. An ash removing method of the present invention can be employed as a method of removing ash deposited in the above filter.

DESCRIPTION OF REFERENCE NUMERALS

1: inner partition wall, 2: cell, 3: outer partition wall, 5: circumferential wall, 8: plugging portion, 10: honeycomb structure, 10a: first end face, 10b: second end face, 11: inner inflow end face, 12: inner outflow end face, 14: inner honeycomb structure body, 14a: convex portion, 16: outer honeycomb structure body, 18: outer inflow end face, 19: outer outflow end face, 20: can member, 21: inlet, 23: inflow tube, 25: barrel portion, 27: second outlet, 28: outlet for EGR, 30: honeycomb substrate, 41: return space, 43: temperature raising assistance space, 51: opening/closing valve, 52: first outlet, 53: bypass pipe, 55: second valve, 57: exhaust pipe, 60: filter group, 61: first honeycomb structure, 62: second honeycomb structure, 63: third honeycomb structure, 121: inlet, 127: outlet, 100, 200 and 300: exhaust gas treating device, L: width, and X: system total length.

What is claimed is:
1. An exhaust gas treating device comprising:
a honeycomb structure having porous partition walls defining a plurality of cells extending from a first end face which is one end face to a second end face which is the other end face;
a can member which stores the honeycomb structure and has an inlet and an outlet for an exhaust gas; and
an opening/closing valve disposed in the outlet of the can member to open and close the outlet,
wherein the honeycomb structure comprises an inner honeycomb structure body including a honeycomb substrate having porous inner partition walls defining the plurality of cells extending from an inner inflow end face which is the end face on the side of the first end face to an inner outflow end face which is the end face on the side of the second end face and a circumferential wall disposed at a circumference of the honeycomb substrate, an outer honeycomb structure body disposed at a position which surrounds a part of a circumference of the inner honeycomb structure body and is away from the inner inflow end face of the inner honeycomb structure body, the outer honeycomb structure body has porous outer partition walls defining the plurality of cells extending from an outer inflow end face which is the end face on the side of the second end face to an outer outflow end face which is the end face on the side of the first end face, and plugging portions arranged in parts of the cells,
the can member comprises an inflow tube which fits with an end portion of the inner honeycomb structure body on the side of the inner inflow end face and in which the inlet is formed, and a barrel portion which is continuous with the inflow tube,
in the barrel portion, a first outlet of the exhaust gas is formed at a position between the inner inflow end face of the inner honeycomb structure body and the outer outflow end face of the outer honeycomb structure body, and a second outlet of the exhaust gas is formed at a position which faces the second end face of the honeycomb structure, and
the honeycomb structure is stored in the can member in a state of having a clearance which serves as a through channel for the exhaust gas between the second end face and the can member and having a clearance which serves as a through channel for the exhaust gas between the outer outflow end face of the outer honeycomb structure body and the can member.
2. The exhaust gas treating device according to claim 1, which comprises a bypass pipe in which one end portion is coupled with the first outlet of the barrel portion and the other end portion is coupled with a position behind the opening/closing valve in an exhaust pipe coupled with the second outlet of the barrel portion; and a second valve disposed in the bypass pipe.
3. The exhaust gas treating device according to claim 1, wherein the honeycomb structure is disposed so that the outer outflow end face of the outer honeycomb structure body faces downward and so that an extending direction of the cells is parallel to a vertical direction.
4. The exhaust gas treating device according to claim 1, wherein the plugging portions are not arranged in the inner honeycomb structure body or are arranged only in one end portion of the inner honeycomb structure body, and the plugging portions are arranged only in one of end portions of the outer honeycomb structure body or are arranged in both of the end portions.

5. The exhaust gas treating device according to claim 4, wherein the plugging portions are arranged in end portions of the predetermined cells of the cells of the outer honeycomb structure body on the side of the outer inflow end face and end portions of the residual cells of the cells on the side of the outer outflow end face, and the plugging portions are not arranged in the inner honeycomb structure body.

6. The exhaust gas treating device according to claim 4, wherein the plugging portions are arranged in parts of end portions of the inner honeycomb structure body on the side of any one of the inner inflow end face and the inner outflow end face.

7. The exhaust gas treating device according to claim 1, wherein a thickness of the outer partition walls of the outer honeycomb structure body is larger than a thickness of the inner partition walls of the inner honeycomb structure body.

8. The exhaust gas treating device according to claim 1, wherein a cell density of the outer honeycomb structure body is smaller than a cell density of the inner honeycomb structure body.

9. The exhaust gas treating device according to claim 1, wherein the circumferential wall of the inner honeycomb structure body is formed integrally with the inner partition walls of the inner honeycomb structure body.

10. The exhaust gas treating device according to claim 1, wherein in the can member, an outlet for EGR which connects with a route to recirculate the exhaust gas is formed at a position between the inner inflow end face of the inner honeycomb structure body and the outer outflow end face of the outer honeycomb structure body.

11. The exhaust gas treating device according to claim 1, wherein a sound absorbing material is disposed in a clearance between the second end face and the can member.

12. A temperature raising method of a catalyst loaded onto the honeycomb structure of the exhaust gas treating device according to claim 1,
which comprises: closing the opening/closing valve of the exhaust gas treating device; and raising a pressure of an exhaust gas in the can member of the exhaust gas treating device to raise a temperature of the exhaust gas, thereby raising a temperature of the catalyst loaded onto the honeycomb structure.

13. A temperature raising method of a catalyst loaded onto the honeycomb structure of the exhaust gas treating device according to claim 1,
which comprises: raising, by a supercharger, a pressure of an exhaust gas in the can member of the exhaust gas treating device to raise a temperature of the exhaust gas, thereby raising a temperature of the catalyst loaded onto the honeycomb structure.

14. A regeneration method of a honeycomb structure in a state where soot is deposited in the honeycomb structure of the exhaust gas treating device according to claim 1,
which comprises: closing the opening/closing valve of the exhaust gas treating device comprising the honeycomb structure in which the soot is deposited; raising a pressure of an exhaust gas in the can member of the exhaust gas treating device to raise a temperature of the exhaust gas; and burning the soot, thereby regenerating the honeycomb structure.

15. A regeneration method of a honeycomb structure in a state where soot is deposited in the honeycomb structure of the exhaust gas treating device according to claim 1,
which comprises: raising, by a supercharger, a pressure of an exhaust gas in the can member of the exhaust gas treating device to raise a temperature of the exhaust gas; and burning the soot, thereby regenerating the honeycomb structure.

16. An ash removing method of removing ash in a honeycomb structure in a state where the ash is deposited in the honeycomb structure of the exhaust gas treating device according to claim 2,
which comprises: opening the opening/closing valve while closing the second valve in the exhaust gas treating device, to generate a flow of a fluid toward the outer inflow end face from the outer outflow end face of the outer honeycomb structure body of the honeycomb structure, thereby removing the ash deposited in the outer honeycomb structure body of the honeycomb structure.

* * * * *